United States Patent [19]

Paranjpe et al.

[11] 4,223,320

[45] Sep. 16, 1980

[54] JET PRINTER AND ELECTRODE ASSEMBLY THEREFOR

[75] Inventors: Suresh C. Paranjpe, Dayton; John W. Donahue, Bellbrook, both of Ohio

[73] Assignee: The Mead Corporation, Dayton, Ohio

[21] Appl. No.: 970,481

[22] Filed: Dec. 18, 1978

[51] Int. Cl.$^2$ .............................................. G01D 15/18

[52] U.S. Cl. .............................................. 346/75

[58] Field of Search .............................. 346/75, 140 R

[56] References Cited

U.S. PATENT DOCUMENTS

| | | | |
|---|---|---|---|
| 3,975,741 | 8/1976 | Solyst | 346/75 |
| 4,010,477 | 3/1977 | Frey | 346/75 |
| 4,080,607 | 3/1978 | Van Breeman et al. | 346/75 |
| 4,096,626 | 6/1978 | Olsen et al. | 346/75 X |
| 4,122,458 | 10/1978 | Paranjpe | 346/75 |

*Primary Examiner*—George H. Miller, Jr.
*Attorney, Agent, or Firm*—Biebel, French & Nauman

[57] ABSTRACT

An ink jet printer produces high resolution printing from continuously flowing, non-stimulated jets. The jets are produced from a common manifold by rows of staggered orifices, all being relatively small in diameter. Drop deflection is accomplished by laminated electrode assemblies which are activated at a lower frequency than the natural drop formation frequency, so that each printed spot on the printing substrate is covered with a fairly large number of relatively small drops.

11 Claims, 9 Drawing Figures

JET PRINTER AND ELECTRODE ASSEMBLY THEREFOR

BACKGROUND OF THE INVENTION

This invention relates generally to high quality, non-stimulated ink jet recording and printing. Typical prior art in the field of non-stimulated ink jet recording includes Ranger et al U.S. Pat. No. 1,817,098, and Hansell U.S. Pat. No. 1,941,001. These patents disclose arrangements of one or more continuously flowing and non-stimulated jets, which are deflected by electrical fields for printing control purposes. In general, arrangements such as those taught by Hansell and by Ranger et al have relatively limited resolution capability and cannot produce high quality printing. Accordingly, more recent systems, such as those shown in Taylor et al U.S. Pat. No. RE 28,219, Frey U.S. Pat. No. 4,010,477, and Van Breemen et al U.S. Pat No. 4,080,607, produce printing by employing staggered rows of jets, each jet being stimulated at a frequency near its natural frequency for breakup into uniformly sized and regularly spaced drops.

These latter systems print with high resolution, so long as the jets are stimulated by a clean stimulating perturbation; that is, a stimulating disturbance which is a pure sinusoid of the correct frequency and without harmonic distrubances at other frequencies. When the stimulation signal is not clean, the jets produce small satellites as well as primary drops. Furthermore, under more severe conditions of poor stimulation, the print head electrodes may become shorted out, so that printing is interrupted. Reference may be made to Stoneburner U.S. Pat. No. 3,882,508 and to Cha U.S. Pat. No. 4,095,232 for background information on print head stimulation and attendant problems.

Ink jet printers which operate without need of stimulation are disclosed in Hertz et al U.S. Pat. No. 3,416,153 and in Hertz U.S. Pat. No. 3,916,412. The system disclosed in 3,416,153 produces a continuously flowing, non-stimulated jet and controls the jet for printing purposes by applying a high level charge thereto. The high level of charge diffuses the jet to form a spray which is then prevented from reaching the printing surface. Hertz 3,916,421 teaches an improvement of the earlier patent, wherein signal control electrodes are provided to impress an electrical charge directly on the droplets at the drop formation point, and a deflection electrode is provided for deflecting the drops which are so charged. The signal control electrodes are positioned within separate supply tubes which terminate in relatively small nozzles said to have a diameter from 10 to 50 microns.

SUMMARY OF THE INVENTION

In the jet printing head of the present invention a series of continuously flowing and non-stimulated ink streams are generated by an orifice plate which communicates with a common manifold. The orficies are regularly spaced within a plurality of staggered rows. Positioned below the orifice plate are a plurality of electrode assemblies, which are provided with exposed electrodes for effecting a combined charge/deflect condition in response to appropriate control signals. The electrodes are substantially parallel to their associated streams and extend for a sufficient distance to bracket substantially all natural non-stimulated drop breakoff positions. The jets preferably have a diameter of less than about 0.7 mils, so that the naturally occuring drops are all quite small in diameter. Drop switching control signals have an upper frequency substantially less than the natural drop generation frequency, to that one printing resolution cell may be produced by about 25 drops. Under such conditions, variations in drop size and drop spacing produced by natural breakup do not substantially degrade printing.

Electrode assemblies for accomplishing the above mentioned charging and deflection may be conveniently fabricated from stacks of laminated non-conductive sheets having aligned edges for defining an electrode face. Electrical leads for electrodes along the electrode face may be brought into the assembly at different levels within the laminated structure.

It is therefore an object of this invention to provide an improved high resolution ink jet printer utilizing non-stimulated streams of continuously flowing ink.

Other objects and advantages of the invention 10 will be apparent from the following description, the accompanying drawings, and the appended claims.

DESCRIPTION OF THE PREFERRED EMBODIMENTS

Figure 1:
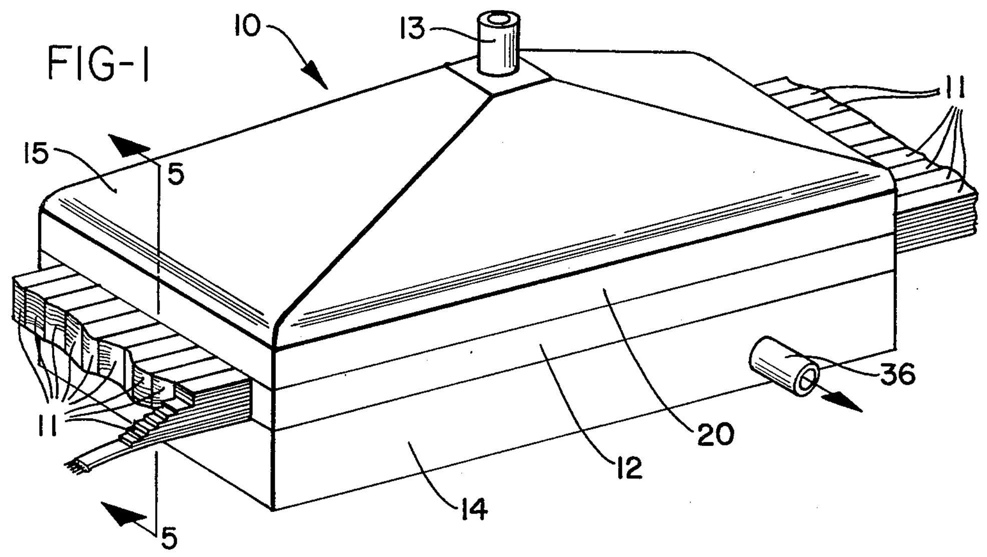
FIG. 1 is a perspective view of an ink jet print head.

An ink jet print head 10, produced in accordance with this invention, may be configured as generally illustrated in FIG. 1. The head 10 comprises an ink supply manifold 15, an upper frame member 20, and a lower frame member 14. A pair of end plates 12 are disposed between frame members 14 and 20 for housing and supporting the operative printing control elements, including a series of electrode assemblies 11. Print head 10 also includes an ink supply line 13 and an evacuation line 36 which is connected to a suitable source of vacuum.

Figure 4:
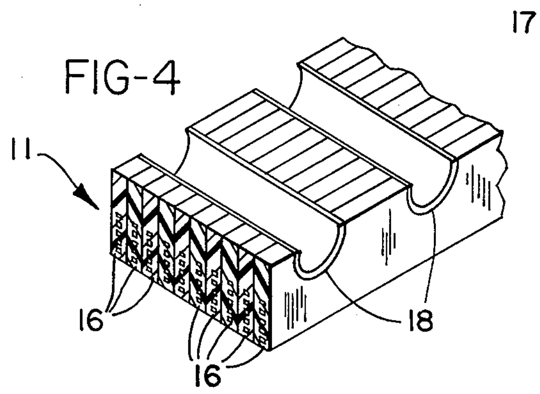
FIG. 4 is a perspective view of a portion of a charge plate assembly.
Figure 7:
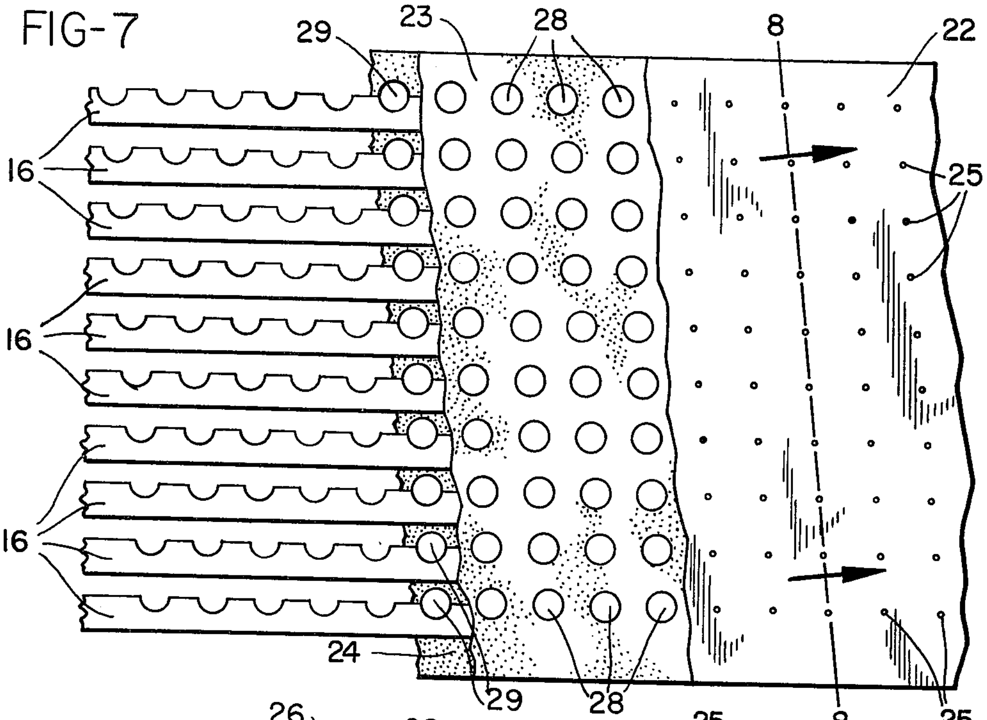
FIG. 7 is a cut away plan view of a ink jet print head.

Print head 10 may comprise ten electrode assemblies 11, which are arranged in staggered relationship as generally illustrated in FIG. 7. Details of one such electrode assembly 11 are illustrated in pictorial fashion in FIG. 4. As shown in the figure, the principal components of an electrode assembly are a laminated set of plate members 16 and a series of semi-cylindrical electrodes 18.

Plate members 16 are provided with a series of recessed surface areas 19 for engagement with electrodes 18.

Figure 2:
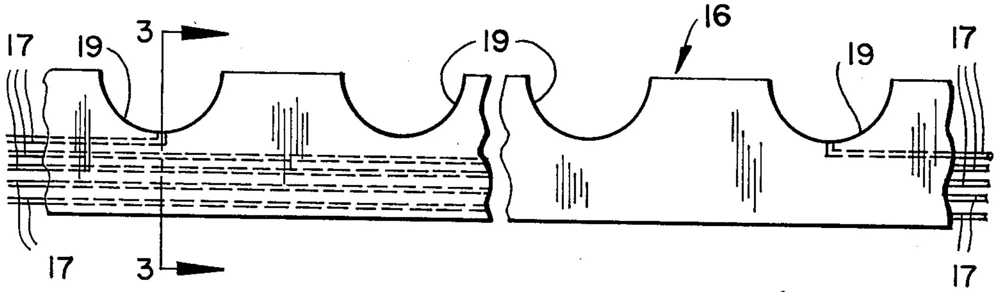
FIG. 2 is a plan view of a charge plate strip.
Figure 3:
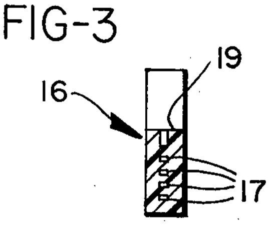
FIG. 3 is a cross sectional view of a charge plate strip taken along lines 3—3 of FIG. 2.
Figure 6:
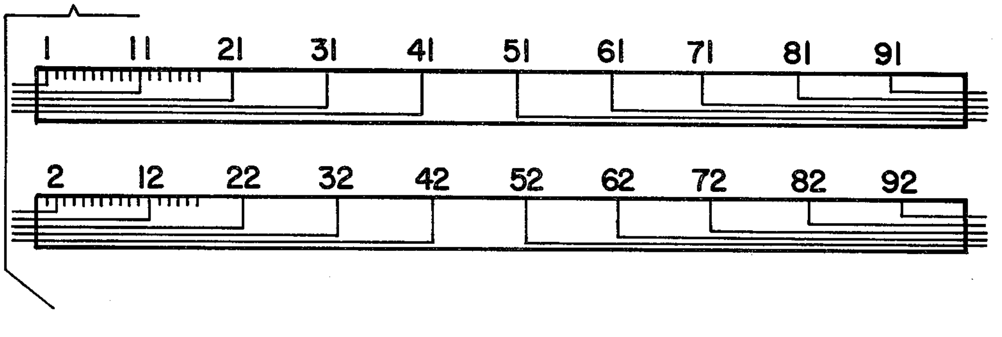
FIG. 6 is a schematic illustration of electrical connections to different charge plate strips within a charge plate assembly.

Each plate member 16 is a laminated structure including a series of buried electrical leads 17, as best illustrated in FIGS. 2 & 3. Preferably plate members 16 are fabricated from a polyimide material, and they may be in the order of about 0.008 inches thick. They are fabricated in the same manner as commercially available flexible electrical cables, with lead lines 17 extending inwardly from each end. A typical plate member 16 have 100 recessed areas 19 and ten lead lines 17. In such an arrangement there may be five lead lines extending inwardly from each end for communication with every fifth recessed area, as illustrated schematically in FIG. 6. Thus the lead lines from the left hand end of one plate member may extend to recessed area numbers 1, 11, 21, 31, and 41. Similarly, lead lines from the right hand end of the plate member may extend to recessed area numbers 51, 61, 71, 81 and 91. This provides connection points for ten electrodes 18. Connection for another ten electrodes 18 are similarly provided by ten lead lines 17 forming part of another plate member 16, which is laminated against the previously described plate member. As shown in FIG. 6, this second plate member may have connections to recessed surfaces area numbers 2, 12, 22, . . . 92. A stacked assembly of ten such plate members therefore provides electrical connections for 100 electrodes 18 comprising one electrode assembly 11. An arrangement of ten such electrode assemblies thereby provides switching control for 1,000 jets.

Electrode assemblies 11 are fabricated by a process which involves aligning and bonding a stack of plate members 17. The plate members are bonded together by a suitable epoxy to create a relatively stiff laminate having flexible non-bonded ends. The non-bonded ends, as illustrated in FIG. 1, provide means for connection to appropriate switching control circuitry. Electrodes 18 are fabricated by coating the aligned recesses 19 with conductive epoxy. Alternatively, electrodes 18 may be fabricated by electroless deposition of gold. It will be seen that each electrode 18 is connected to one lead line 17 at one, but only one, of the different layers comprising the electrode assembly (see FIG. 9).

As an alternative to the above described process, electrode assemblies 11 may be fabricated by selectively etching layers of photosensitive glass to produce conductor paths and pouring a low melting point alloy into the conductor paths so etched. This is followed by a lamination step, all as taught by Olsen et al U.S. Pat. No. 4,096,626. However, electrical connections to electrodes 18 must in any case be made at different levels within the laminate, so that there can be access to all connections from the ends of the assembly.

Figure 5:
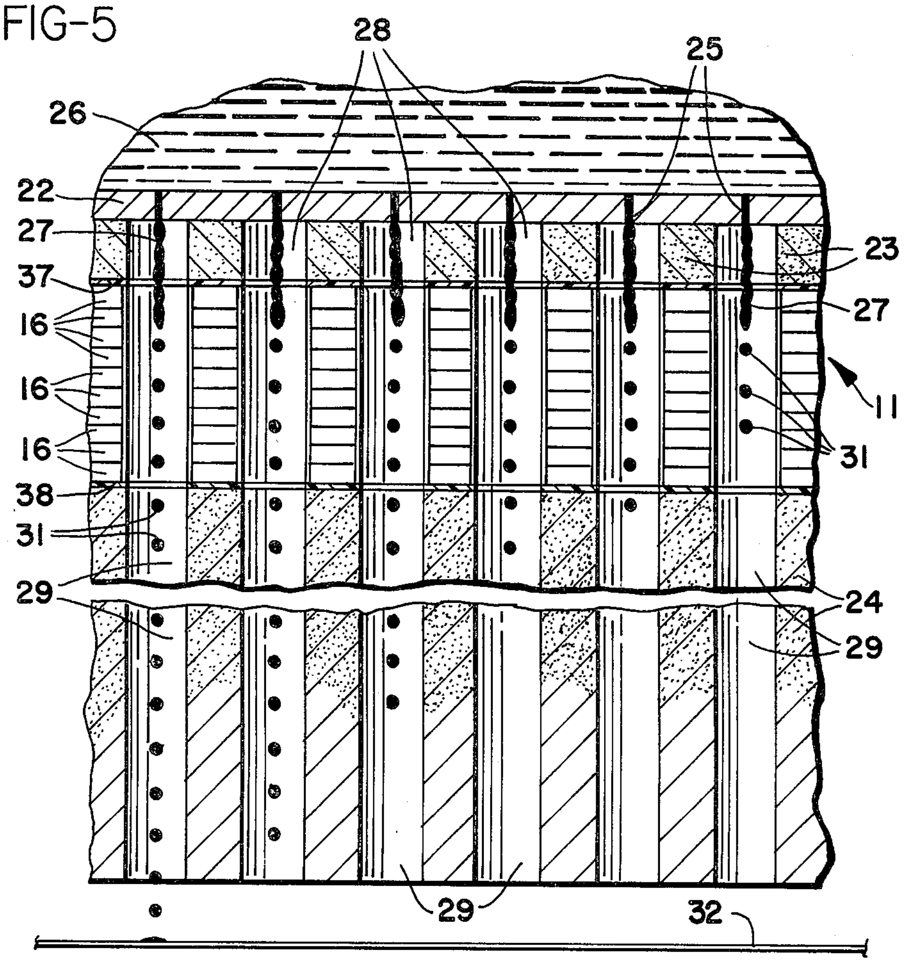
FIG. 5 is a side elevation view of an ink jet print head.
Figure 8:
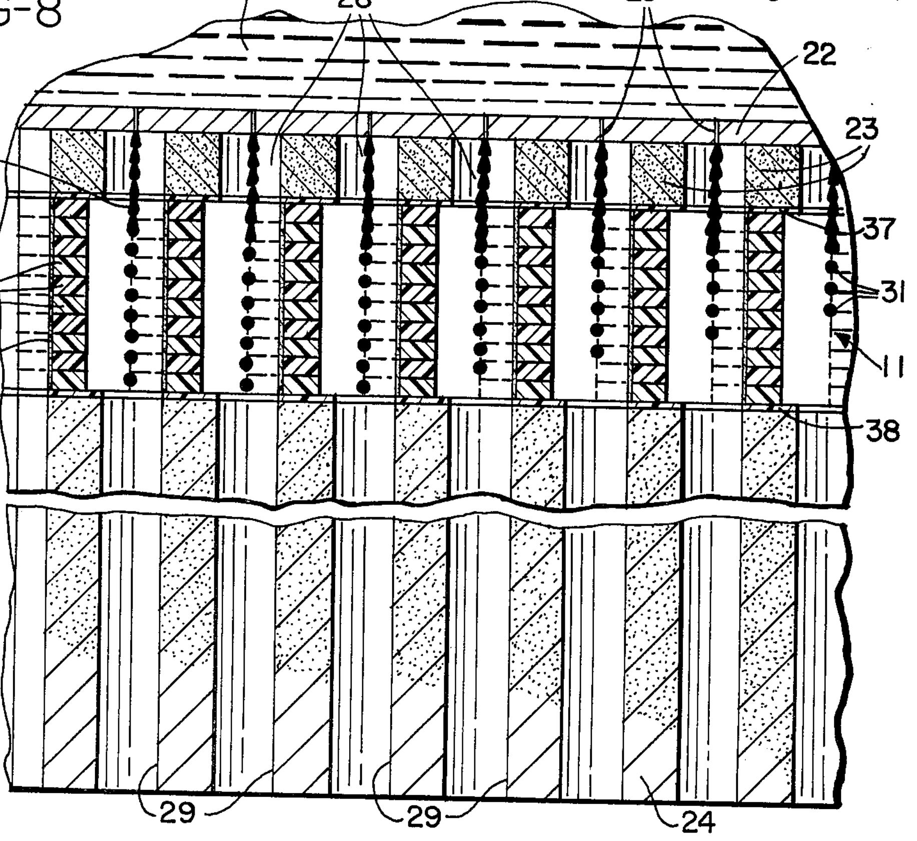
FIG. 8 is an elevation view of a portion of an ink jet print head taken generally along lines 8—8 of FIG. 7.

The overall internal assembly of print head 10 is shown in FIGS. 5 and 8 as comprising, in addition to electrode assemblies 11, an orifice plate 22, a spacing plate 23, and a catching block 24. Orifice plate 22 has a series of orfifices 25, which communicate with a supply of pressurized ink 26 maintained within mainfold 15. The ink 26 flows through orifices 25 to form a series of continuously flowing streams 27. Spacing plate 23 and catching block 24 are provided with cylindrical passages 28 and cylindrical passages 29, which are in alignment with orifices 25. There are also provided electrically insulative coating layers 37 and 38 respectively. Spacing plate 23 and catching block 24 are fabricated from a porous material, which may be a sintered powdered metal. Ink which collected on the surfaces of passages 28 and 29 is drawn into the interstices of plate member 23 and catching block 24 and thence into an evacuation chamber, defined by the inner walls of lower frame member 14 and connected to evacuation line 36.

In preferred embodiment, orifices 25 have a diameter less than about 0.7 mils and more preferably have a diameter in the order of about 0.45 mils. Preferably ink 26 is maintained at a pressure of about 30 psi, so that ink streams 27 have a nominal filament length of about 60 mils. The streams 27 experience natural Rayleigh breakup into drops at a frequency of about 200 KHz. Due to the random nature of the breakup, there is some variation about the nominal frequency and some variation in the nominal filament length for streams 27.

In general the filament length varies from a minimum of about 45 mils to a maximum of about 75 mils, with a 60 mil nominal. To accommodate such filament length variation, spacing plate 23 may have a thickness of about 30 mils, and electrode assemblies 11 may have an overall thickness of about 80 mils. Catching block 24 may be about 150 mils thick and spaced about 20 mils from a printing surface to provide a total print distance of about 280 mils. Streams 27 are arranged with a single row center-to-center distance of 50 mils, so that a staggered arrangement of ten such rows provides an effective resolution of about 200 lines per inch.

Figure 9:
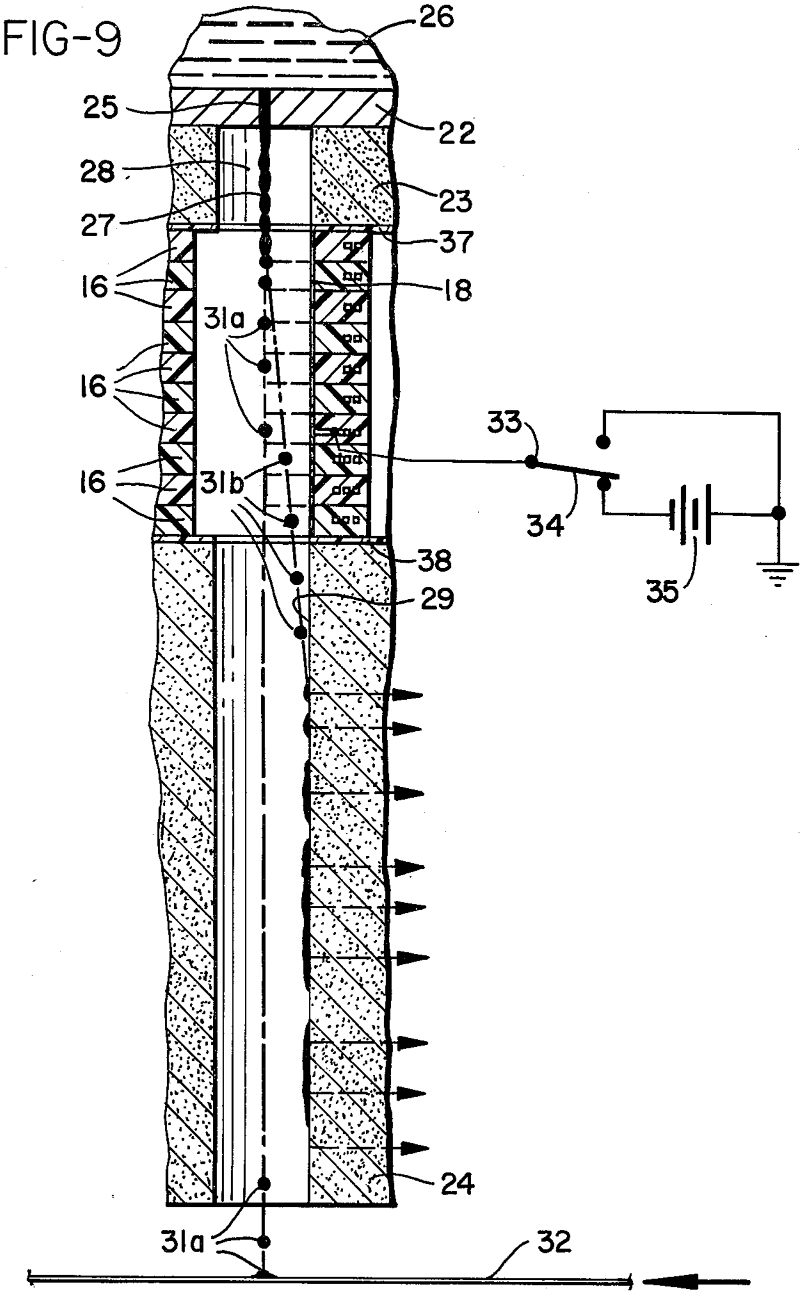
FIG. 9 is an enlarged pictorial representation of drop deflection and catching.

Drop deflection and catching of a series of drops 31 are achieved as generally illustrated in FIG. 9. As therein illustrated, some of the drops 31*a* are selected for printing while others 31*b* are selected for catching. Those drops which are selected for printing fall in a more or less straight line toward the surface of a printing member 32. Those drops which are selected for catching are deflected to the wall of passage 29 and ingested into the intersticial passages of catching block 24. Drop deflection is accomplished by application of a electrical potential to a terminal 33, which is connected to electrical lead 17. The maximum switching frequency of the signals applied to terminal 33 may be in the order of about 8 KHz, so that drops 31 are switched in packets of about 25 drops, more or less. Twenty-five such drops produce a printed dot size of about 7 mils diameter on the surface of printing member 32.

Since electrode 18 presents a surface charge facing only one side of the drop stream, there is a natural attraction between the charged electrode and the drop stream. Thus electrode 18 functions as a combined charging/deflection electrode. When a potential is applied to terminal 33, then a packet of about 25 drops are charged with a charage of opposite sign, and those drops are deflected toward the wall of passage 29. When terminal 33 is connected to ground potential, then the drops 31 remain uncharged and undeflected. This switching action is represented schematically by switch 34 and potential source 35.

It will be appreciated that a fairly large capacity but otherwise conventional control module is required for switching control of 1,000 jets. The control module may be constructed in accordance with the teachings of Taylor et al U.S. Pat. No. RE 28,219. As taught by Taylor et al, switching of jets in different rows is performed in accordance with a switching delay related to the movement speed of printing member 32. The potential applied to electrode 18 for combined charging/deflection of drops 31 is in the order of about 100 volts and is therefore comparable to the charge applied to electrodes used in some prior art systems for charging only.

It is therefore seen that the print head of this invention produces high quality printing without the need for drop stimulation and without any requirement for high voltage deflection electrodes. While the form of apparatus herein described contitutes a preferred embodiment of the invention, it is to be understood that the invention is not limited to this precise form of apparatus and that changes may be made without departing from the scope of the invention.

We claim:

1. Ink jet printing head comprising:

(a) a manifold for maintaining a supply of pressurized ink, (b) an orifice plate communicating with said manifold and provided with a plurality of rows of regularly spaced orifices for generating a plurality of rows of continuously flowing ink streams, the orifices in each row being staggered with respect to the orifices in the other rows, (c) a plurality of electrode assemblies positioned below said orifice plate for charging and deflecting drops which are naturally produced by said streams, each electrode assembly having an electrode face provided with a series of exposed electrodes for selectively charging and deflecting drops in different corresponding streams within one of said rows and each electrode extending substantially parallel to its associated stream for a sufficient distance to bracket substantially all natural, non-stimulated drop breakoff positions and charge and deflect drops which break off from the stream at any of such positions, (d) different catching faces for catching drops deflected by respective ones of said electrodes, (e) removal means for removing from said catching faces all of the liquid accumulating as a result of said catching, and (f) electrical lead means connected to said electrodes for application thereto of charge/deflect signals.

2. Apparatus according to claim 1 wherein each said electrode assembly comprises a laminated stack of electrically non-conductive plate members with aligned edges defining said electrode face, said electrodes being adhered to said electrode face, and said electrical lead means being connected to different ones of said electrodes at different levels within said stack.

3. Apparatus according to claim 2 wherein said catching faces are porous surfaces and said removal means comprises interstices within the porous material defining said surfaces.

4. Apparatus according to claim 2 further comprising a porous catching block provided with a series of cylindrical passages defining said catching faces and an interstitial structure defining said interstices.

5. Apparatus according to claim 4 wherein said orifices have diameters less than 0.7 mils.

6. Apparatus according to claim 4 wherein each said orifice has a diameter in the order of about 0.45 mils and wherein said electrodes have a length in the order of about 80 mils.

7. Apparatus according to claim 6 further comprising a porous spacing member sandwiched between said electrode assemblies and said orifice plate, said porous spacing member having a thickness in the order of about 30 mils and being provided with a series of cylindrical passages spaced in alignment with said orifices to provide passage for said streams.

8. Apparatus according to any of claims 1–7, further comprising switch means connected to said electrical lead means for generating said charge/deflect signals at a frequency substantially lower than the nominal frequency at which the drops in any one of said streams are naturally formed.

9. An electrode assembly for a jet drop printer comprising a series of plate members bonded together in laminated relationship, and a series of electrodes adhered to one face of said laminated assembly, each such electrode spanning the thickness of a plurality of said plate members, and each such plate member being of non-conductive material and having a series of buried electrical leads extending inwardly from at least one end and leading sidewardly for connection to different ones of said electrodes, so that each electrode is connected to one electrical lead from one of said plate members and may be activated by connection to said at least one end.

10. Apparatus according to claim 9 wherein said plate members have aligned recesses and wherein said electrodes and adhered to said face within said aligned recesses.

11. Apparatus according to either of claims 9 or 10 wherein each such plate member has a series of buried electrical leads extending inwardly from two opposed ends and leading sidewardly as aforesaid.

* * * * *